United States Patent
Park et al.

(10) Patent No.: US 10,506,175 B2
(45) Date of Patent: Dec. 10, 2019

(54) METHOD FOR PROCESSING IMAGE AND ELECTRONIC DEVICE SUPPORTING THE SAME

(71) Applicant: Samsung Electronics Co., Ltd., Gyeonggi-do (KR)

(72) Inventors: Jae Hyoung Park, Gyeonggi-do (KR); Kyong Tae Park, Gyeonggi-do (KR); Kyoung Joon Park, Gyeonggi-do (KR); Jeong Won Lee, Gyeonggi-do (KR); Jae Sung Jun, Seoul (KR)

(73) Assignee: Samsung Electronics Co., Ltd (KR)

( * ) Notice: Subject to any disclaimer, the term of this patent is extended or adjusted under 35 U.S.C. 154(b) by 109 days.

(21) Appl. No.: 15/722,724

(22) Filed: Oct. 2, 2017

(65) Prior Publication Data

US 2018/0098001 A1    Apr. 5, 2018

(30) Foreign Application Priority Data

Sep. 30, 2016 (KR) .......................... 10-2016-0127158

(51) Int. Cl.
*H04N 5/232* (2006.01)
*H04N 5/262* (2006.01)
(Continued)

(52) U.S. Cl.
CPC .............. *H04N 5/2621* (2013.01); *G06T 5/50* (2013.01); *G06T 7/73* (2017.01); *H04N 5/2351* (2013.01);
(Continued)

(58) Field of Classification Search
CPC ........... H04N 5/23212; H04N 9/04555; H04N 5/36961; H04N 9/04557; H04N 9/045;
(Continued)

(56) References Cited

U.S. PATENT DOCUMENTS 8,249,337 B2    8/2012  Whitehead et al.
8,265,378 B2    9/2012  Whitehead et al.
(Continued)

FOREIGN PATENT DOCUMENTS

EP       2 869 270        5/2015
KR     1020150049122      5/2015
(Continued)

OTHER PUBLICATIONS

Anonymous: "7.5 Sparkle", Internet, XP055440992, https://docs.gimp.org/2.4/en/plug-in-sparkle.html, Jan. 3, 2017, 3 pages.
(Continued)

*Primary Examiner* — Hung H Lam
(74) *Attorney, Agent, or Firm* — The Farrell Law Firm, P.C.

(57) ABSTRACT

An electronic device includes a lens part that receives light from the outside, an image sensor that changes the received light to electronic image data, and an image processing unit that processes the image data. If a saturated pixel is included in the image data, the image processing unit measures the amount of light of the saturated pixel by using an increasing or decreasing value of brightness of a plurality of unsaturated pixels around the saturated pixel.

20 Claims, 10 Drawing Sheets

(51) Int. Cl.
    *H04N 5/235*     (2006.01)
    *H04N 9/74*     (2006.01)
    *G06T 5/50*     (2006.01)
    *G06T 7/73*     (2017.01)

(52) U.S. Cl.
    CPC ....... *H04N 5/2356* (2013.01); *H04N 5/23229* (2013.01); *H04N 9/74* (2013.01); *G06T 2207/10016* (2013.01); *G06T 2207/10144* (2013.01); *H04N 5/2628* (2013.01)

(58) Field of Classification Search
    CPC .............. H04N 5/3696; H01L 27/1463; H01L 27/14603; H01L 27/14627; H01L 27/14621; H01L 27/14689
    See application file for complete search history.

(56) References Cited

U.S. PATENT DOCUMENTS

| | | | |
|---|---|---|---|
| 8,509,528 B2 | 8/2013 | Whitehead et al. | |
| 8,610,797 B2 | 12/2013 | Oyama | |
| 9,516,290 B2 | 12/2016 | Lin et al. | |
| 9,554,037 B2 | 1/2017 | Lee | |
| 2007/0182845 A1* | 8/2007 | Hunter | H04N 5/2351 348/362 |
| 2007/0269104 A1 | 11/2007 | Whitehead et al. | |
| 2008/0031517 A1 | 2/2008 | Whitehead et al. | |
| 2012/0176399 A1 | 7/2012 | Whitehead et al. | |
| 2012/0287307 A1 | 11/2012 | Oyama | |
| 2013/0243283 A1* | 9/2013 | Kotchou | G06T 7/0012 382/128 |
| 2014/0300802 A1* | 10/2014 | Hamano | H04N 5/23212 348/354 |
| 2015/0116542 A1 | 4/2015 | Lee | |
| 2016/0105656 A1 | 4/2016 | Lin et al. | |
| 2017/0148142 A1 | 5/2017 | Park | |
| 2018/0007256 A1* | 1/2018 | Yoshino | G03B 13/36 |
| 2018/0120534 A1* | 5/2018 | Mohri | G02B 7/282 |

FOREIGN PATENT DOCUMENTS

| | | |
|---|---|---|
| KR | 1020170060498 | 6/2017 |
| WO | WO 2005/101309 | 10/2005 |

OTHER PUBLICATIONS

Anonymous: "7.2 Gradient Flare", Internet, XP055440997, https://docs.gimp.org/2.4/en/plug-in-glare.html, Sep. 5, 2007, 7 pages.
European Search Report dated Jan. 23, 2018 issued in counterpart application No. 17194321.0-1208, 10 pages.

* cited by examiner

METHOD FOR PROCESSING IMAGE AND ELECTRONIC DEVICE SUPPORTING THE SAME

PRIORITY

This application claims priority under 35 U.S.C. § 119(a) to Korean Patent Application Serial No. 10-2016-0127158, which was filed in the Korean Intellectual Property Office on Sep. 30, 2016, the entire content of which is incorporated herein by reference.

BACKGROUND

1. Field of the Disclosure

The present disclosure relates to a method for processing an image and an electronic device supporting the same.

2. Description of Related Art

Various types of photographing devices, including imaging devices, such as a digital single-lens reflex (DSLR) camera, a mirror-less digital camera, and the like are being designed. Also, an electronic device such as a smartphone, a tablet personal computer (PC), and the like typically include a camera module and provides a function of photographing a picture or taking a video. The photographing device may provide various photographing modes, and a user may select a photographing mode depending on the environment the user wishes to take the photograph in.

A lens of the photographing device has a function to focus incident light. The lens may have a function of diversifying a way to represent a picture, in addition to the light focusing function. For example, techniques such as an out-focusing technique, an apodization filter, and light burst may be applied to an image, depending on a lens used. Since the user is not able to capture all these techniques through a single lens, the user may need various lenses for the purpose of photographing an image.

In the case of applying effects (e.g., out-focusing, apodization, light burst, and the like) by a point light source to an image, the photographing device applies the effects based on optical characteristics of a lens to the image. A camera module in a mobile electronic device such as a smartphone or the like may be difficult to use with various lenses, and may be difficult to apply the effects to an image.

In recent years, a technology has been developed for artificially adding an optical effect, such as out-focusing, to an image through image processing. In this case, if blur processing of a convolution system is performed on a light source subject during the image processing, an image different from an image generated in the case where the effects are applied through a lens may be generated, thereby changing how the user perceives the image. Also, a point light source subject may generally appear as a saturated pixel in an image, and the amount of light from the point light source subject may be distorted.

SUMMARY

According to an aspect of the present disclosure, an image processing method and an electronic device supporting the same are provided, which extract the amount of light from a point light source to provide a light source effect similar to the method of using a lens.

In accordance with an aspect of the present disclosure, an electronic device includes a lens part configured to receive light from the outside; an image sensor configured to change the received light to electronic image data; and an image processing unit configured to process the image data. If a saturated pixel is included in the image data, the image processing unit measures the intensity light from the saturated pixel from a plurality of unsaturated pixels around the saturated pixel.

In accordance with an aspect of the present disclosure, an image processing method performed in an electronic device is provided. The method includes changing light received from the outside to electronic image data through an image sensor; collecting image data of a first image having a first exposure time; if a saturated pixel is included in the image data, verifying an increasing or decreasing value from brightness from a plurality of unsaturated pixels around the saturated pixel; and measuring the amount of light from the saturated pixel based on the increasing or decreasing value.

BRIEF DESCRIPTION OF THE DRAWINGS

The above and other aspects, features, and advantages of embodiments of the present disclosure will be more apparent from the following description taken in conjunction with the accompanying drawings, in which.

Throughout the drawings, it should be noted that like reference numbers may be used to depict the same or similar elements, features, and structures.

DETAILED DESCRIPTION

Figure 1:
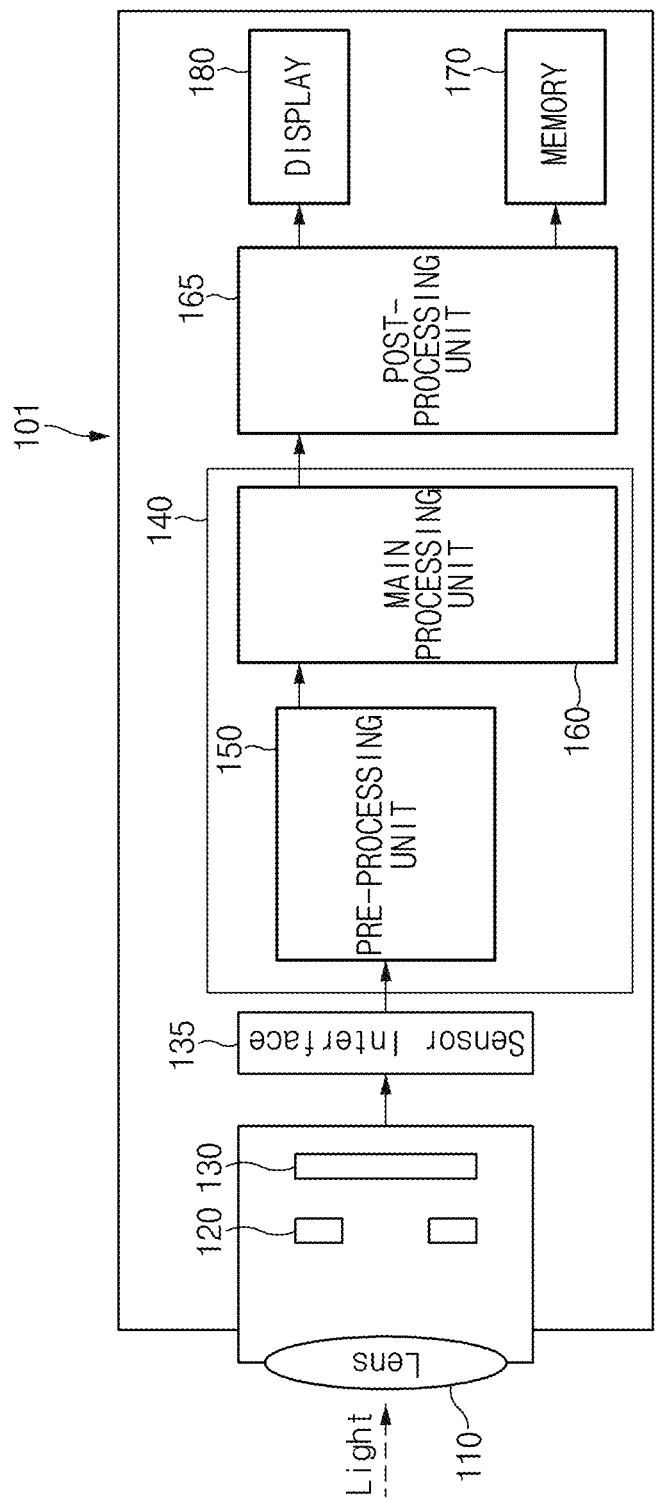
FIG. 1 is a view illustrating a configuration of an electronic device according to an embodiment of the present disclosure.

In the present disclosure, the expressions "have", "may have", "include" and "comprise", "may include", and "may comprise" used herein indicate existence of corresponding features (for example, elements such as numeric values, functions, operations, or components) but do not exclude the presence of additional features.

In the present disclosure, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used interchangeably with "suitable for", "having the capacity to", "designed to", "adapted to", "made to", or "capable of". The term "configured to (or set to)" does not mean only "specifically designed to" in hardware. Instead, the expression "a device configured to" may mean that the device is "capable" of operating together with another device or other components (e.g., central processing unit (CPU)). A "processor configured to (or set to) perform A, B, and C" may mean a dedicated processor (e.g., an embedded processor) for performing a corresponding operation or a generic-purpose processor (e.g., a CPU or an application processor (AP)) which may perform corresponding operations by executing one or more software programs which are stored in a memory device.

Terms used in this specification are used to describe embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal fashion unless expressly so defined herein in embodiments of the present disclosure. In some cases, even if terms are defined in the specification, they are not to be interpreted to exclude embodiments of the present disclosure.

An electronic device according to embodiments of the present disclosure may include at least one of smartphones, tablet PCs, mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. The wearable devices may include accessories (e.g., watches, rings, bracelets, ankle bracelets, glasses, contact lenses, or head-mounted devices (HMDs)), cloth integrated types (e.g., electronic clothes), body attached types (e.g., skin pads or tattoos), or implantable types (e.g., implantable circuits).

In an embodiment of the present disclosure, the electronic device may be a home appliance. The home appliance may include at least one of a digital versatile disk (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic panel.

In an embodiment of the present disclosure, the electronic device may include at least one of medical devices (e.g., portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (e.g., a navigation device for vessels and a gyro compass), avionics, a security device, a vehicular head unit, an industrial or home robot, an automatic teller machine (ATM), a point of sales (POS) device, or an Internet of things (IoT) device (for example, a light bulb, sensors, an electricity or gas meter, a spring cooler device, a fire alarm device, a thermostat, an electric light pole, a toaster, a sporting apparatus, a hot water tank, a heater, and a boiler).

In an embodiment of the present disclosure, the electronic device may include at least one of a furniture or a part of a building/structure, an electronic board, an electronic signature receiving device, a projector, or measurement devices (e.g., a water service, electricity, gas, or electric wave measuring device). The electronic device may be one or a combination of the aforementioned devices. The electronic device may be a flexible electronic device. Further, the electronic device is not limited to the aforementioned devices, but may include new electronic devices produced due to the development of new technologies.

The term "user" used herein may refer to a person who uses an electronic device or may refer to a device (e.g., an artificial intelligence electronic device) that uses an electronic device.

FIG. 1 is a view illustrating a configuration of an electronic device according to an embodiment of the present disclosure.

Referring to FIG. 1, an electronic device 101 may be a device that collects light reflected from an external subject to photograph a picture or a video. The electronic device 101 may include a lens part 110, a shutter part 120, an image sensor 130, a sensor interface 135, an image processing unit (or a processor) 140, a post-processing unit 165, a memory 170, and a display 180.

The lens part 110 according to an embodiment of the present disclosure may collect light from a subject. The collected light may be captured by the image sensor 130.

The shutter part 120 according to an embodiment of the present disclosure may adjust the amount of light exposed to the image sensor 130 through slit driving. For example, the shutter part 120 may be implemented with a shutter having a mechanical shape or may be implemented with an electronic shutter through control of a sensor. For another example, the shutter part 120 may be a shutter in which only a front curtain (e.g., a front shutter curtain) is electronically implemented.

The image sensor 130 according to an embodiment of the present disclosure may convert light into electronic image data by using a photoelectric conversion effect. The image data may be transferred to the image processing unit 140 through the sensor interface 135. The image sensor 130 may include a group of pixels arranged two-dimensionally and may convert light into electronic image data at each pixel.

According to an embodiment of the present disclosure, the image sensor 130 may adjust the amount of light reaching the image sensor 130 (e.g., the amount of light exposed thereto) by adjusting the shutter part 120 with an exposure time determined in the image processing unit 140. The image sensor 130 may further include a mechanical structure functioning as a variable aperture that adjusts the amount of light that reaches the image sensor 130.

According to an embodiment of the present disclosure, the image sensor 130 may read out electronic image data according to the photoelectric conversion effect recorded in each pixel.

Through various processing operations, the image processing unit (or the processor) 140 may output image data collected in the image sensor 130 in the display 180 or may store the collected image data in the memory 170. In an embodiment of the present disclosure, the image processing unit 140 may include a pre-processing unit 150 and a main processing unit 160.

The pre-processing unit (e.g., a pre image signal processor (ISP)) 150 according to an embodiment of the present disclosure may perform a function such as image registration, gamma processing, and the like before image processing is performed in the main processing unit (e.g., the image processing unit) 160. For example, in the case where there is blurring between a plurality of images photographed continuously, the pre-processing unit 150 may remove or reduce a blurring component through the image registration process.

The main processing unit 160 (e.g., an AP, an ISP, or a peripheral controller) according to an embodiment of the present disclosure may perform digital signal processing on an image signal processed through the pre-processing unit 150. After correcting and composing signals received from the pre-processing unit 150 to generate the whole image signal, the main processing unit 160 may display the generated whole image signal through the display 180. The main processing unit 160 may perform a function of controlling overall operations such as signal amplification, signal conversion, signal processing, and the like.

According to an embodiment of the present disclosure, the main processing unit 160 may calculate a location and brightness of a light source included in an image and may apply various effects (e.g., out-focusing, apodization, and light burst) with respect to a point where each light source is placed. The main processing unit 160 may calculate a location and brightness of a light source by using one short-exposure image or a plurality of images having different exposures. The sensor interface 135 may perform an interface between the image sensor 130 and the image processing unit 140. The sensor interface 135 may be placed in front of or next to the pre-processing unit 150 depending on a configuration of the electronic device 101.

The post-processing unit 165 according to an embodiment of the present disclosure may store an image signal provided from the main processing unit 160 in the memory 170 or the display 180. The post-processing unit 165 may convert and transfer an image signal into a format supported by the memory 170 or the display 180.

The memory 170 may store an image processed through the image processing unit 140.

The display 180 may output image data processed in the image processing unit 140 allowing the user to verify the image data.

Figure 2:
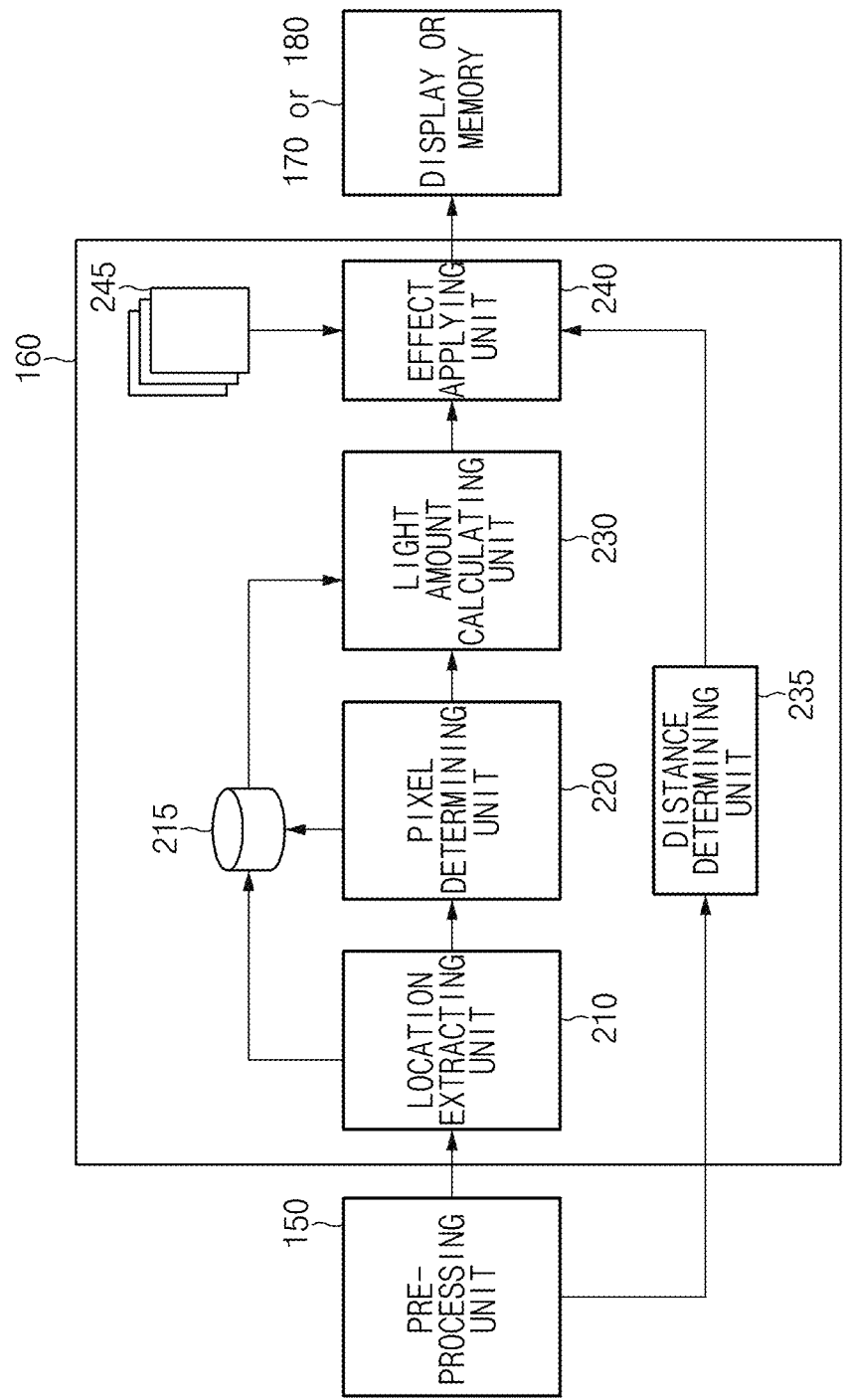
FIG. 2 is a block diagram illustrating a configuration of a main processing unit according to an embodiment of the present disclosure.

FIG. 2 is a block diagram illustrating a configuration of a main processing unit according to an embodiment of the present location. Elements of FIG. 2 may be classified depending on functions, and some of the elements may be omitted or integrated.

Referring to FIG. 2, the main processing unit 160 may receive image data from the pre-processing unit 150 or may receive image data from a plurality of images that are photographed continuously or within a specified time interval.

According to an embodiment of the present disclosure, in the case where the main processing unit 160 receives data from a plurality of images, the main processing unit 160 may receive data from a plurality of images having different exposure times.

For example, the main processing unit 160 may receive data of a first image having an exposure time shorter than a normal (or reference) exposure time (e.g., $\frac{1}{16}$s) and data of a second image photographed depending on the normal exposure time. The main processing unit 160 may analyze a light source by using the first and second images, and may apply various effects to a normal exposure image stored as the final result. The normal or reference exposure time may be an exposure time that is set by the user or is set automatically. Below, a description will be given with respect to the case where the first and second images are used. However, embodiments of the present disclosure are not limited thereto. For example, it may be possible to analyze a light source by using one image or to analyze a light source by using three or more images.

In the case where the user pushes a shutter or executes any user interface (e.g., a gesture, a voice, and the like) corresponding to pushing the shutter, the first image and the second image may be sequentially photographed. In an embodiment of the present disclosure, in the case where blurring occurs in an image between the first image and the second image, the pre-processing unit 150 may execute an image registration process and may transfer the resulting image to the main processing unit 160.

The first image and the second image may have different exposure times and may be images in which out-focusing, light burst, and the like does not occur at a light source (e.g., a point where light is saturated). Below, a description will be given with respect to the case where the first image is a short-exposure image (e.g., an image having an exposure time shorter than an exposure time of user settings or auto settings) and the second image is an normal exposure image (e.g., an image having the exposure time of the user setting or auto settings).

In an embodiment of the present disclosure, after the first image of a short exposure is first input into the main processing unit 160, the second image of a normal exposure may be input into the main processing unit 160. The electronic device 101 may wait an amount of time after storing the first image for the purpose of reduction in shutter lag.

The main processing unit 160 may include a location extracting unit 210, a memory 215, a pixel determining unit 220, a light amount calculating unit 230, a distance determining unit 235, an effect applying unit 240, and a lookup table 245.

The location extracting unit 210 according to an embodiment of the present disclosure may detect a point or a light source having a brightness of a specified value or more from an image. For example, in the first image of short exposure, the location extracting unit 210 may store coordinates of pixels having brightness of a preset value or more, or coordinates of a start point and coordinates of an end point of pixels having brightness of the preset value or more, and a gain of each pixel in the memory 215, for each read-out line of the image sensor 130. In the case where there are consecutive pixels, the number of which is a specific value or more, having a brightness of the preset value or more, the location extracting unit 210 may store information about the pixels in the memory 215 using a hysteresis method.

The pixel determining unit 220 according to an embodiment of the present disclosure may detect a saturated pixel. The pixel determining unit 220 may detect saturated pixels for each read-out line of the first image of the short exposure. The pixel determining unit 220 may store coordinate information of a start and an end position of the detected saturated pixels in the memory 215, for each read-out line of the image sensor 130.

The light amount calculating unit 230 may calculate the actual amount of light from a light source, based on a location, which is detected in the location extracting unit 210, from a point light source in an image and the coordinate information of the saturated pixels determined in the pixel determining unit 220.

According to an embodiment of the present disclosure, the light amount calculating unit 230 may calculate the amount of light from a light source by using the second image appropriately exposed. For example, in the case of computing the amount of light by using the first image and the second image, the light amount calculating unit 230 may compute the amount of light from a light source with reference to an exposure difference (e.g., 16 times) between the first image and the second image and the amount of light of an adjacent unsaturated pixel around a saturated pixel.

The distance determining unit 235 may analyze an image to calculate a distance from a subject or to calculate a distance from a focus. The distance information calculated in the distance determining unit 235 may be provided to the effect applying unit 240 or may be used to apply an effect such as out-focusing, apodization, and the like.

The effect applying unit 240 may apply various light source effects based on the calculated amount of light. The effect applying unit 240 may apply a light source effect by tracking the amount of light with reference to the lookup table 245 and replacing data of a saturated pixel or data of a specified area with respect to the saturated pixel depending on a ratio of the amount of light.

The lookup table 245 may store ways to apply various effects (e.g., out-focusing, light burst, apodization, and the like) associated with a light source in the form of a table. Additional information about the lookup table 245 may be given with reference to FIG. 6.

According to an embodiment of the present disclosure, the effect applying unit 240 may apply a light source effect with reference to the depth & segmentation result.

According to an embodiment of the present disclosure, the main processing unit 160 may track the amount of light from a point light source by using a first image of short exposure. In this case, the location extracting unit 210 may not perform a separate function, and when a saturated pixel of a short-exposure image is determined in the pixel determining unit 220, the location extracting unit 210 may calculate the amount of a saturated pixel portion with reference to a value of an adjacent unsaturated pixel around the saturated pixel. When the second image of a normal exposure is received, the main processing unit 160 may replace data of a saturated pixel portion with data that a light source effect is applied.

The main processing unit 160 may output image data to which the light source effect is applied. The image data may be stored in the memory 170 or may be output through the display 180.

Figure 3:
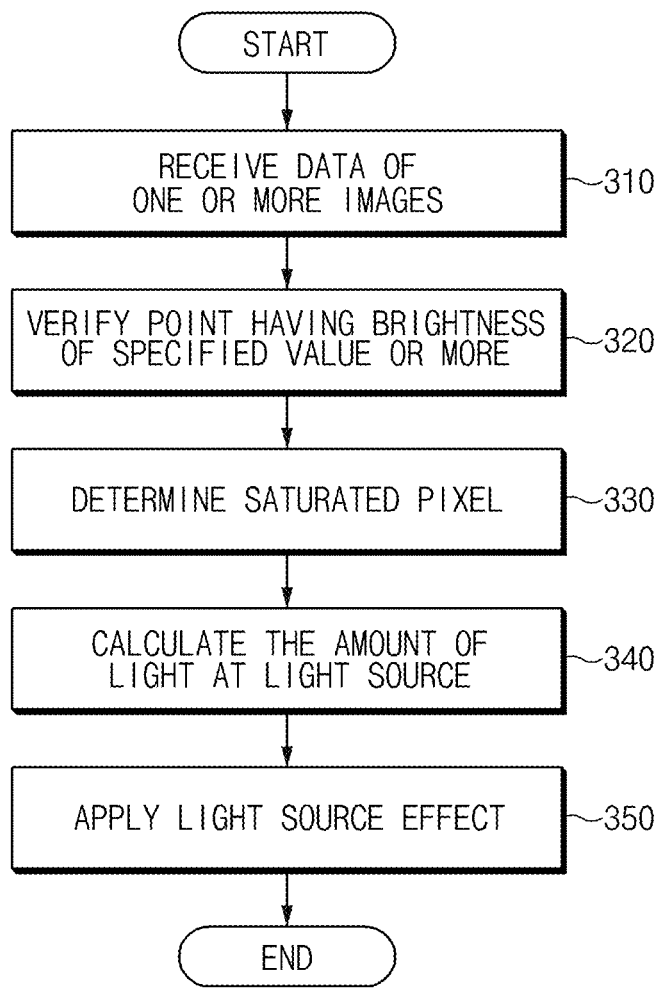
FIG. 3 is a flowchart illustrating an image processing method according to an embodiment of the present disclosure.

FIG. 3 is a flowchart illustrating an image processing method according to an embodiment of the present disclosure.

Referring to FIG. 3, in step 310, the main processing unit 160 may receive image data from the pre-processing unit 150.

In step 320, the main processing unit 160 may verify a point having brightness of a specified value or more. The main processing unit 160 may store start and end coordinates of pixels of brightness with a preset value or more, and a gain of the pixel in the memory 170.

In step 330, the main processing unit 160 may detect saturated pixels. Coordinate information of a start and an end of a line unit from the detected saturated pixels may be stored in the memory 170.

In step 340, the main processing unit 160 may calculate the amount of light from a light source subject, based on a location of the detected light source and the coordinate information of the saturated pixel. The main processing unit 160 may extract the actual amount of light of a saturated portion through a first-order fitting operation by using an unsaturated adjacent pixel.

In step 350, the main processing unit 160 may apply a light source effect to an image with reference to the lookup table 245. For example, when the second image of a normal exposure is received, the main processing unit 160 may replace data from a saturated pixel region with data to which a light source effect is applied.

According to an embodiment of the present disclosure, an image processing method performed in an electronic device includes changing light received from the outside to electronic image data through an image sensor, collecting image data of a first image having a first exposure time, if a saturated pixel is included in the image data, verifying an increasing or decreasing value of brightness of a plurality of unsaturated pixels around the saturated pixel, and measuring the amount of light from the saturated pixel based on the increasing or decreasing value.

According to an embodiment of the present disclosure, verifying the increasing or decreasing value includes verifying the amounts of light from the first and second adjacent pixels from a first direction with respect to the saturated pixel, and verifying the amount of light of the saturated pixel by using the third and fourth adjacent pixels from a second direction opposite to the first direction.

According to an embodiment of the present disclosure, verifying the increasing or decreasing value includes comparing a slope value of the amount of light between the first and second adjacent pixels, and a slope value of the amount of light between the third and fourth adjacent pixels.

According to an embodiment of the present disclosure, collecting the image data includes collecting image data from a second image having a second exposure time longer than the first exposure time.

According to an embodiment of the present disclosure, the method further includes applying a light source effect to a region corresponding to the saturated pixel from the second image.

According to an embodiment of the present disclosure, applying the light source effect includes applying one of out-focusing, apodization, or light burst as the light source effect.

Figure 4:
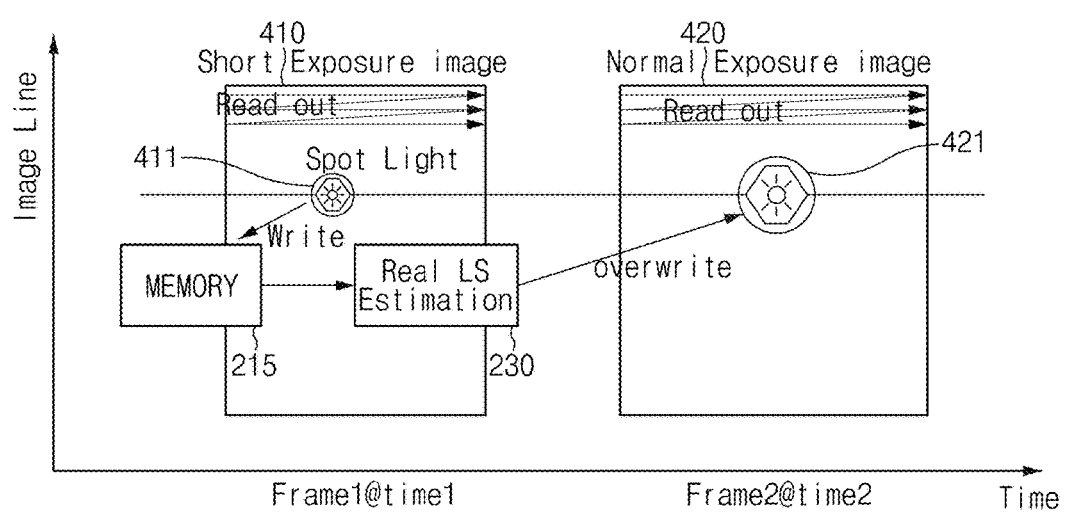
FIG. 4 is a view illustrating timing signals for extracting a point light source by using a first image and a second image according to an embodiment of the present disclosure.

FIG. 4 is a view illustrating timing signals for extracting a point light source by using a first image and a second image according to an embodiment of the present disclosure. In the case where an exposure ratio of a second image to a first image is "N" and an exposure time of the first image is "t", an exposure time of the second image may be approximately equal to (N*t).

Referring to FIG. 4, the image sensor 130 may read a brightness value from each pixel. Coordinates and a brightness value of spot light 411 may be extracted from a first image 410 that has a short exposure time, and the extracted coordinates and brightness value may be stored in the memory 215.

The light amount calculating unit 230 may detect a pixel saturated by the spot light 411 and adjacent pixels of a pre-saturation state around the saturated pixel. The light amount calculating unit 230 may extract the real amount of light from a saturated portion through a first-order fitting operation. The light amount calculating unit 230 may use two unsaturated pixels for the purpose of the first-order fitting operation. The two adjacent pixels may be obtained by using a peripheral value of a saturated pixel from the first image 410 with a short exposure time, may be obtained by using the first image 410 with a short exposure time and a second image 420 with a normal exposure time, or may be obtained by using only the second image 420 with a normal exposure time.

Figure 5:
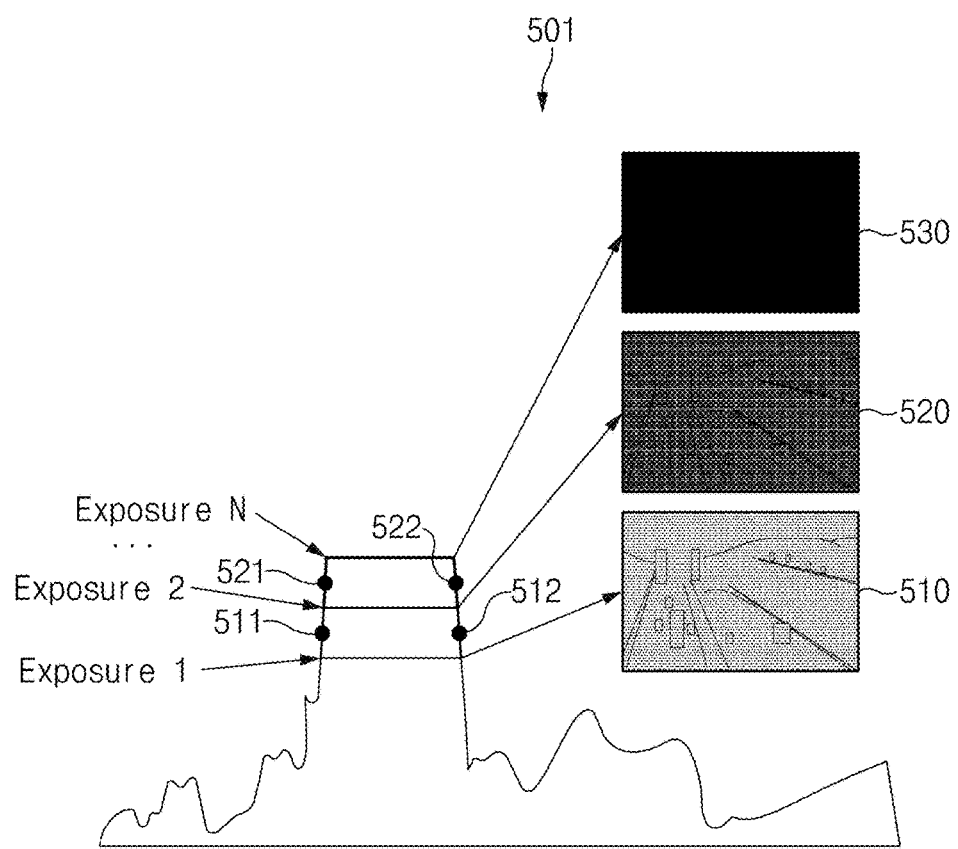
FIG. 5 is a graph describing how the amount of light is measured by using a plurality of images of different exposures.

FIG. 5 is a graph describing how the amount of light is measured by using a plurality of images of different exposures.

Referring to FIG. 5, the light amount calculating unit 230 may extract the real amount of light from a saturated portion through a first-order fitting operation. The light amount calculating unit 230 may calculate a light amount value for an actually saturated region by using a peripheral value of a saturated pixel. As such, the light amount calculating unit 230 may extract the amount of light from the saturated region by using the small number of short exposure images.

The light amount calculating unit 230 according to an embodiment of the present disclosure may calculate the amount of light from the saturated portion by using an N-th image 530, which has the shortest exposure time among N images having different exposure times.

If an exposure ratio coefficient between the N-th image 530 and a normal exposure image ("Exposure 1") 510 is multiplied by data of the N-th image 530, a value that coincides with data of the Exposure 1 510 may be obtained in the remaining portion other than the spot light or the saturated portion. Since the N-th image is an image of the shortest exposure time compared with Exposure 1 510, the quality of an unsaturated region decreases may be displayed, and the N-th image may be displayed as a noise region depending on the capability of a sensor and an exposure ratio. In contrast, the N-th image 530 may include image data of a relatively high accuracy around a saturated pixel.

In a read-out sequence of a short exposure time image, it may be possible to obtain a first slope value by performing a first-order fitting operation on two pixels 511 and 521 before saturation and to obtain a second slope value by performing the first-order fitting operation on two pixels 522 and 512 after saturation. In an embodiment of the present disclosure, the light amount calculating unit 230 may calculate the amount of light at a saturated pixel by using one, of which an absolute value is relatively small, among the first slope value and the second slope value.

According to an embodiment of the present disclosure, in the case where the amount of light from a light source extracted from the whole image is small or large even though a value is obtained through a fitting operation, the light amount calculating unit 230 may perform an operation of applying a global variable or a local variable to the whole image data to correct a part of the amount of light. In this case, a high-quality image in which a relative ratio of the amounts of light of saturation spot lights is maintained uniformly may be obtained.

Figure 6:
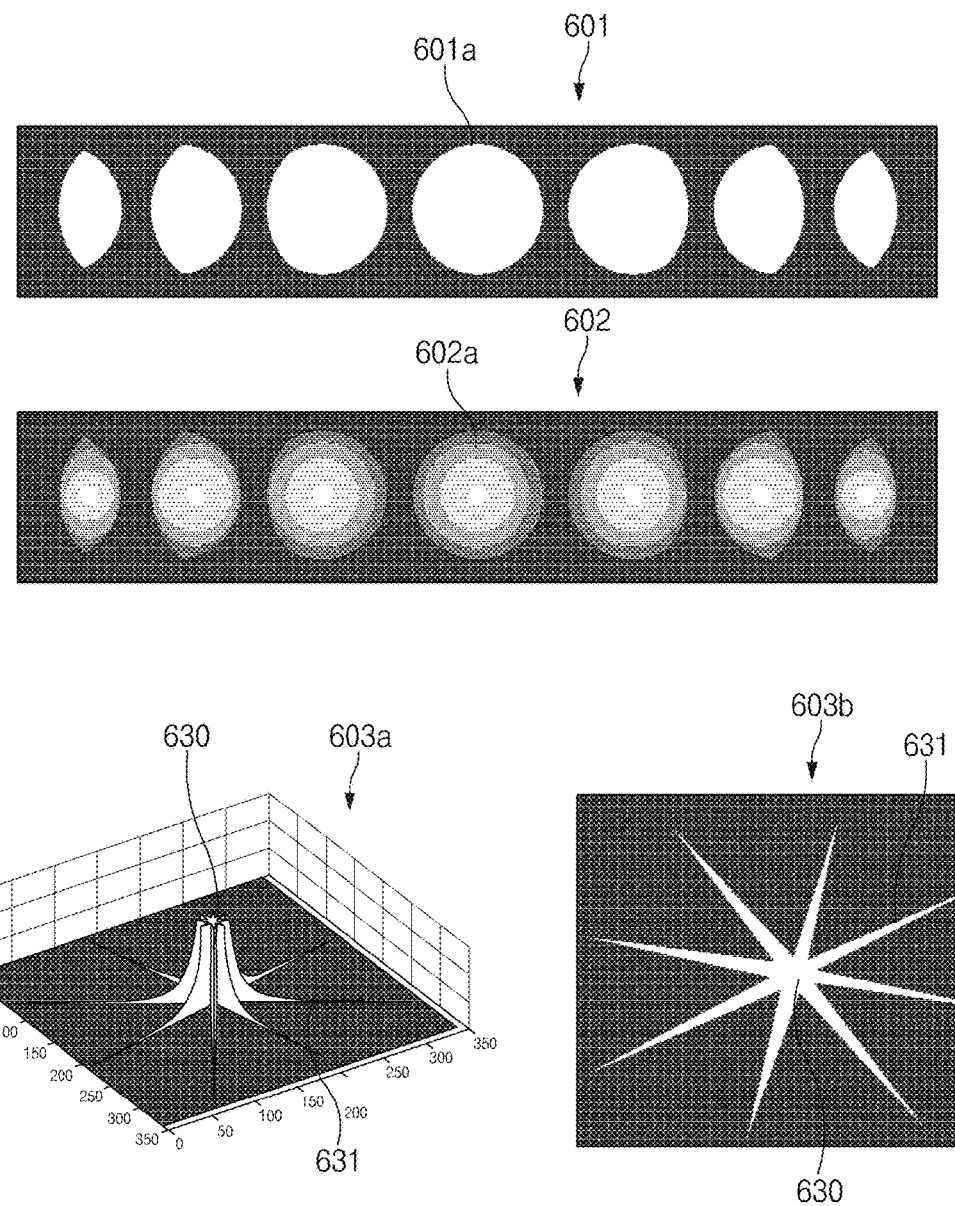
FIG. 6 illustrates lookup tables for applying light source effects according to an embodiment of the present disclosure.

FIG. 6 illustrates using lookup tables for applying light source effects according to an embodiment of the present disclosure.

Referring to FIG. 6, lookup tables 601, 602, 603a, and 603b may store effects (e.g., out-focusing, light burst, apodization, and the like) associated with a light source in the form of a table.

The lookup table 601 represents a point spread function (PSF) lookup table for out-focusing, and the lookup table 602 represents a PSF lookup table for an apodization effect. In the lookup tables 601 and 602, a shape change of a horizontal direction represents the PSF according to a distance from a light axis. Complete circles 601a and 602a at the center are the PSF that is based on an exit pupil obtained from around a light axis of a lens part (e.g., from a central region of an image sensor). The PSF may be displayed as overlap of two or more circles as a distance from a light axis increases.

Graphs 603a and 603b represent the PSF for a light burst effect. Unlike out-focusing or apodization, the size of the PSF may change depending on brightness from a point light source, not distance information. A light burst phenomenon appears by diffraction, and a light burst shape may vary depending on brightness from a light source. The PSF of the light burst may have a shape in which a gain sharply decreases as it goes from a center 630 toward a peripheral portion. The size of a blade 631 from the light burst may vary depending on brightness of a point light source. The graph 603a shows clipping is made at the center 630. However, embodiments of the present disclosure are not limited thereto.

Figure 7:
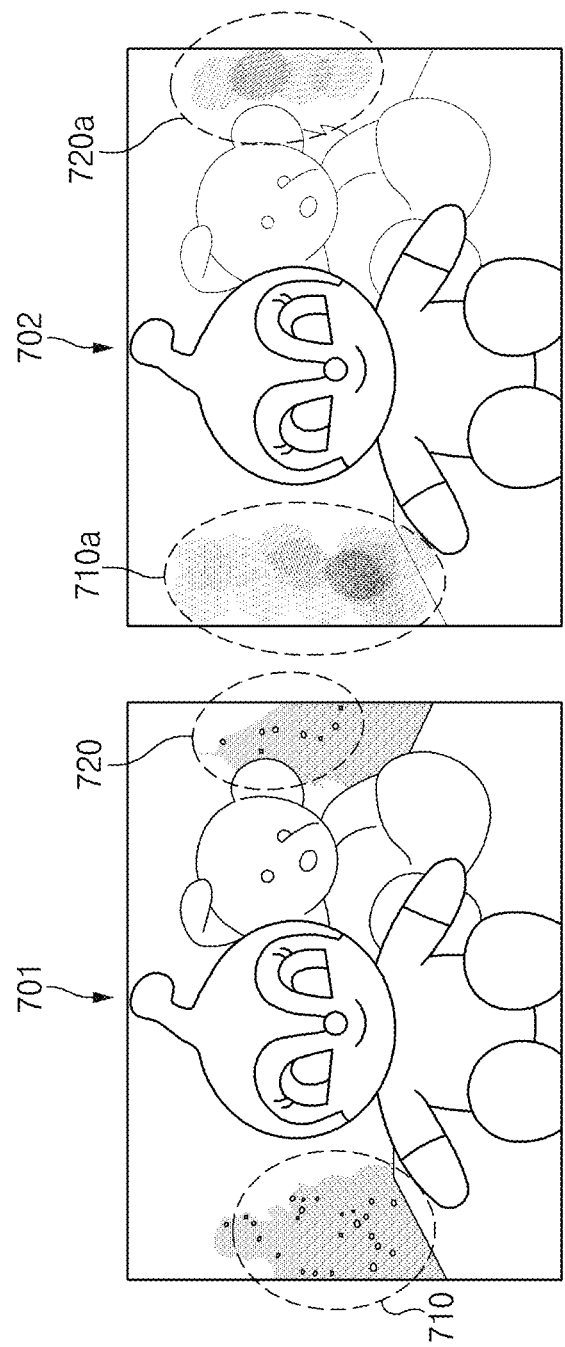
FIG. 7 is a view illustrating an example to which out-focusing according to an embodiment of the present disclosure is applied.

FIG. 7 is a view illustrating an example to which out-focusing according to an embodiment of the present disclosure is applied.

Referring to FIG. 7, before out-focusing is applied, in the case where point light source regions 710 and 720 are included in a first image 701, the point light source regions 710 and 720 may be output in a saturated state. Also, even though there is a difference between the amounts of light from point light sources, the point light sources may not be distinguishable from each other on the first image 701.

After the out-focusing is applied, resulting in a second image 702, the point light source regions 710a and 720a may be displayed in the form of a light lump. The size or shape of a light lump may vary for each image height and for each intensity of light from each point light source.

The main processing unit 160 may calculate the amount of light from a saturated pixel by using unsaturated pixels around a saturated pixel, in each point light source. The main processing unit 160 may replace a point light source portion with a lookup table depending on the calculated intensity of light, distance information, and the like.

According to an embodiment of the present disclosure, in the out-focusing or apodization PSF, the main processing unit 160 may calculate the magnitude of the PSF based on distance information and may replace a point light source portion from an existing image in a shape of the calculated PSF in a normal exposure image.

According to an embodiment of the present disclosure, prior to replacing a point light source from an image, the main processing unit 160 may perform blur processing on an unsaturated portion depending on the separate distance information or may calculate distance information to a subject from the whole image in which a saturation value is calculated, to perform convolution processing. Computation may increase if an operation of a convolution system is used but has the advantage in that calculation is made without distinguishing the extracted point light source and a peripheral image.

According to an embodiment of the present disclosure, the main processing unit 160 may perform an operation of extracting a point light source for each color of a sensor color pattern for the purpose of seizing color information from a real light lump. For example, in the case of a sensor having a Bayer pattern, the main processing unit 160 may calculate saturation information associated with each of R, G, and B in a short exposure image. As such, it may be possible to prevent color information from disappearing (e.g., whitening of a light lump) due to saturation of each color in a normal exposure image and to output a light lump having original color information.

Figure 8:
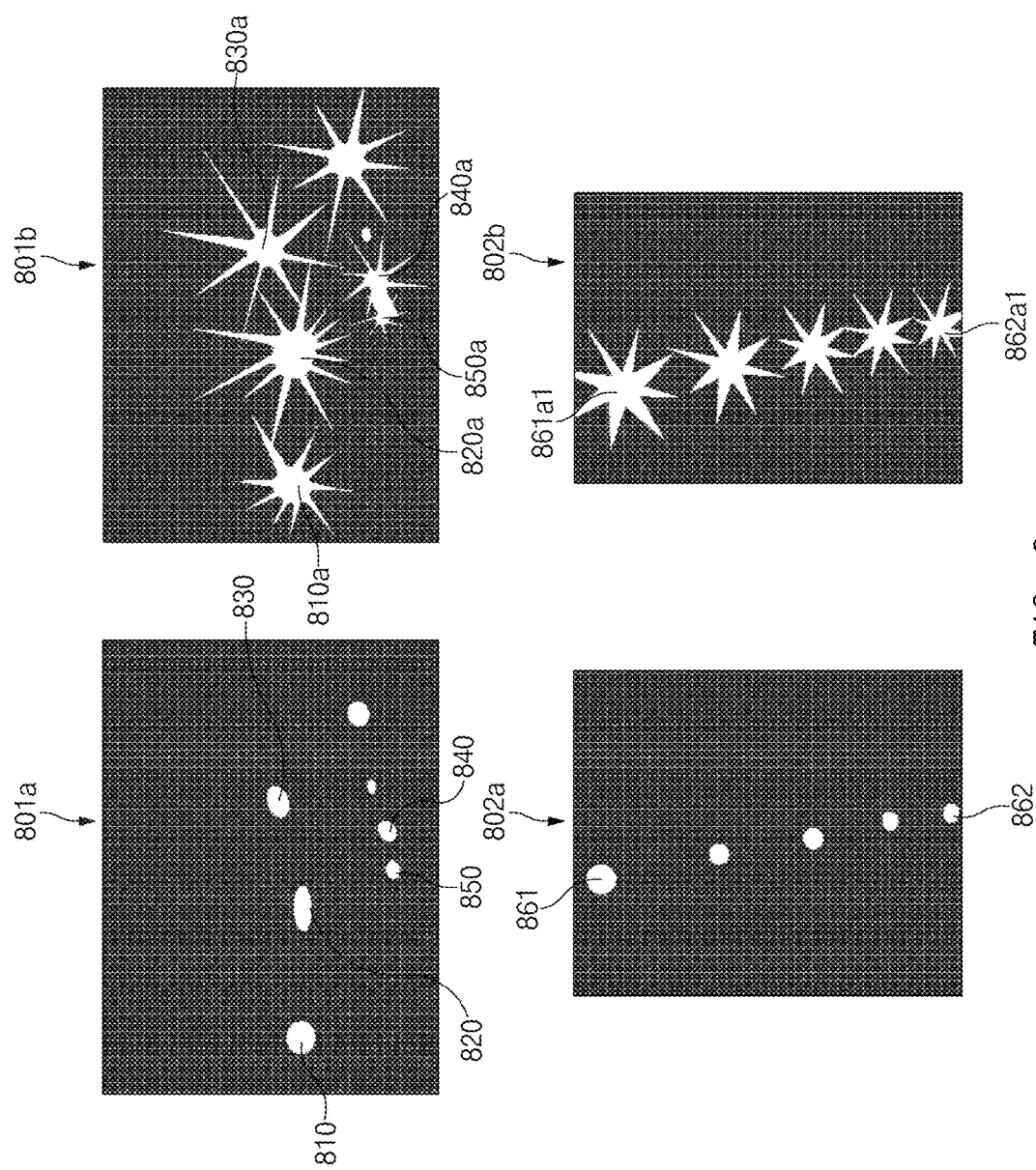
FIG. 8 is view illustrating an image to which light burst according to an embodiment of the present disclosure is applied.

FIG. 8 is a view illustrating an image to which light burst according to an embodiment of the present disclosure is applied.

Referring to FIG. 8, before light burst is applied, in the case where point light sources 810 to 850 are included in a first image 801*a*, the point light sources 810 to 850 may be output in a saturated state, and a light burst effect may not appear. Also, even though there is a difference between the amounts of light from point light sources, the point light sources may not be distinguishable from each other on the first image 801*a*.

After the light burst effect is applied, resulting in a second image 801*b*, point light sources 810*a* to 850*a* may be displayed in the form of a light burst. A length of a blade of light burst may change depending on the intensity of light from each light source.

The main processing unit 160 may calculate the amount of light from a saturated pixel by using unsaturated pixels around a saturated pixel, in each point light source. The main processing unit 160 may replace a point light source portion in the form of a light burst with reference to a lookup table depending on the calculated intensity of light.

According to an embodiment of the present disclosure, in the case of the light burst, the main processing unit 160 may not need distance information. The size of a blade of light burst may be determined depending on brightness from a point light source, and a light bust effect may be applied by replacing, at the effect applying unit 240, a PSF shape depending on the extracted intensity from the point light source. The light burst effect has the PSF in which a brightness value decreases as it goes toward a peripheral portion. As such, the blade size of the light burst may be adjusted smoothly in the case of replacing the calculated intensity of the point light source proportionally with respect to a value from a central portion of the PSF.

Before the light burst effect is applied, in the case where point light sources 861 and 862 are included in a first image 802*a*, the point light sources 861 and 862 may be output in a saturated state, and the light burst effect may not appear. After the light burst effect is applied, in a second image 802*b*, point light sources 861*a*1 and 862*a*1 may be displayed in the form of light burst. A length of a blade of light burst may change depending on the intensity of the amount of light of each light source.

According to an embodiment of the present disclosure, unlike the out-focusing, in the case of the light burst, the main processing unit 160 may obtain color information from a normal exposure time image along with a short exposure time image. The main processing unit 160 may not perform a point light source extracting operation for each color. In the case of a Bayer pattern, after the main processing unit 160 selects a representative color from R, G, and B color information and calculates the amount of light from one light source, the main processing unit 160 may replace an existing point light source with PSF from a light burst effect depending on a color ratio of a normal exposure in the final image.

Figure 9:
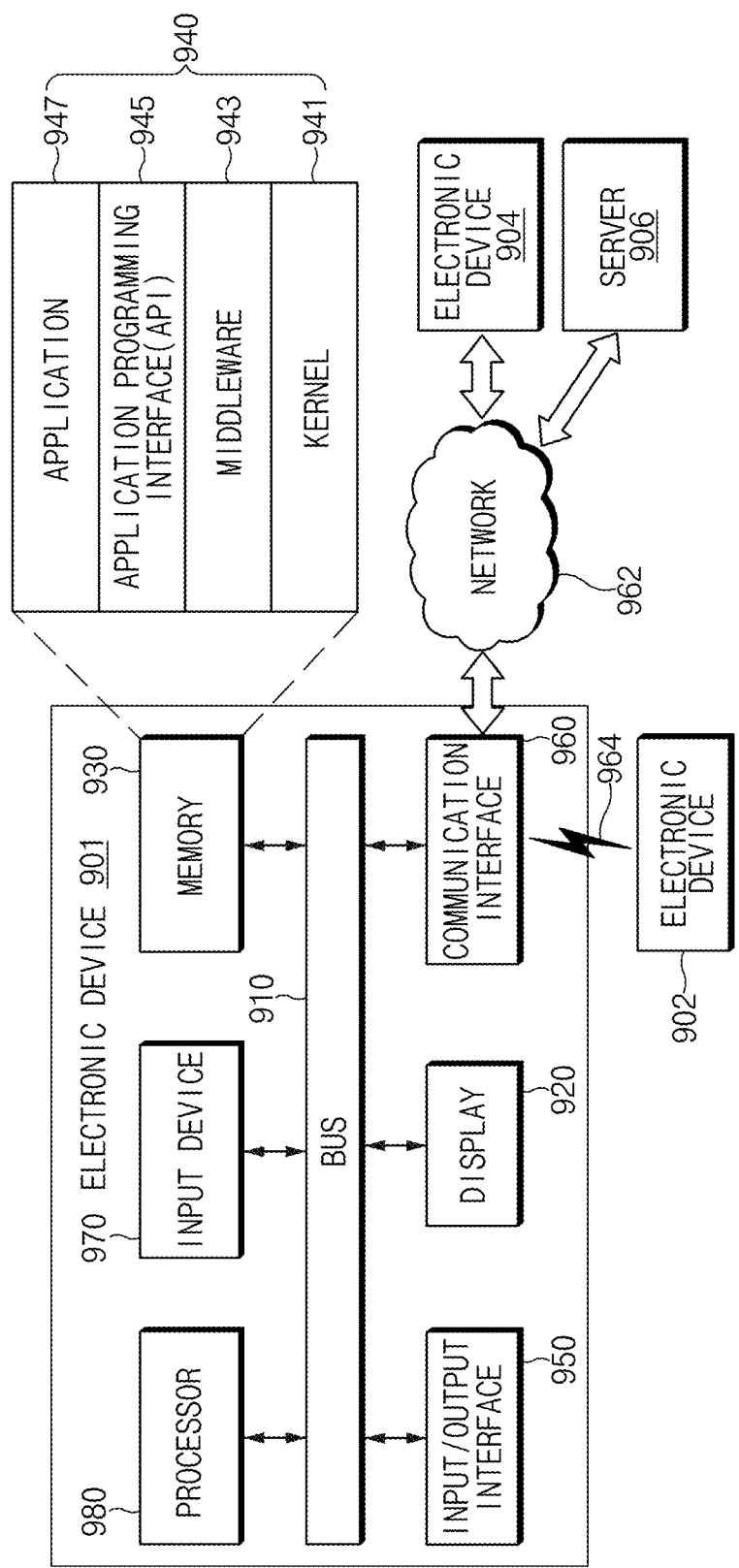
FIG. 9 illustrates the electronic device in a network environment.

FIG. 9 illustrates an electronic device in a network environment according to an embodiment of the present disclosure.

An electronic device 901 in a network environment 900 according to an embodiment of the present disclosure will be described with reference to FIG. 9. The electronic device 901 may include a bus 910, a processor 980, a memory 930, an input/output interface 950, a display 920, communication interface 960, and an input device 970. At least one of the foregoing elements may be omitted or another element may be added to the electronic device 901.

The bus 910 may include a circuit for connecting the above-mentioned elements 910 to 980 to each other and transferring communications (e.g., control messages and/or data) among the above-mentioned elements.

The processor 980 may include at least one of a CPU, an AP, or a communication processor (CP). The processor 980 may perform data processing or an operation related to communication and/or control of at least one of the other elements of the electronic device 901.

The memory 930 may include a volatile memory and/or a nonvolatile memory. The memory 930 may store instructions or data related to at least one of the other elements of the electronic device 901. According to an embodiment of the present disclosure, the memory 930 may store software and/or programs 940. The programs 940 may include a kernel 941, a middleware 943, an application programming interface (API) 945, and/or application programs 947. At least a portion of the kernel 941, the middleware 943, or the API 945 may be referred to as an operating system (OS).

The kernel 941 may control or manage system resources (e.g., the bus 910, the processor 980, the memory 930, or the like) used to perform operations or functions of other programs (e.g., the middleware 943, the API 945, or the application programs 947). Furthermore, the kernel 941 may provide an interface for allowing the middleware 943, the API 945, or the application programs 947 to access individual elements of the electronic device 901 in order to control or manage the system resources.

The middleware 943 may serve as an intermediary allowing the API 945 or the application programs 947 to communicate and exchange data with the kernel 941.

Furthermore, the middleware 943 may handle a plurality of task requests received from the application programs 947 according to an assigned priority. For example, the middleware 943 may assign at least one application program 947 a priority for using the system resources (e.g., the bus 910, the processor 980, the memory 930, or the like) of the electronic device 901. For example, the middleware 943 may handle a plurality of task requests according to the priority assigned to at least one application, thereby performing scheduling or load balancing with respect to the plurality of task requests.

The API 945, which is an interface for allowing the application programs 947 to control a function provided by the kernel 941 or the middleware 943, may include at least one interface or function (e.g., instructions) for file control, window control, image processing, character control, or the like.

The input/output interface 950 may serve to transfer an instruction or data input from a user or another external device to other elements of the electronic device 901. Furthermore, the input/output interface 950 may output instructions or data received from other elements of the electronic device 901 to the user or another external device.

The display 920 may include a liquid crystal display (LCD), a light-emitting diode (LED) display, an organic light-emitting diode (OLED) display, a microelectromechanical systems (MEMS) display, or an electronic paper display. The display 920 may present content (e.g., a text, an image, a video, an icon, a symbol, or the like) to the user. The display 920 may include a touch screen, and may receive a touch, gesture, proximity or hovering input from an electronic pen or a part of a body of the user.

The communication interface 960 may set communications between the electronic device 901 and an external device (e.g., a first external electronic device 902, a second external electronic device 904, or a server 906). For example, the communication interface 960 may be connected to a network 962 via wireless communications or wired communications to allow communication with the external device (e.g., a second external electronic device 904 or a server 906).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include a short-range communications 964. The short-range communications may include at least one of wireless fidelity (Wi-Fi), Bluetooth™, near field communication (NFC), magnetic stripe transmission (MST), or GNSS.

The MST may generate pulses according to transmission data and the pulses may generate electromagnetic signals. The electronic device 901 may transmit the electromagnetic signals to a reader device such as a POS device. The POS device may detect the magnetic signals by using an MST reader and restore data by converting the detected electromagnetic signals into electrical signals.

The GNSS may include at least one of a global positioning system (GPS), a global navigation satellite system (GLONASS), a BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 962 may include at least one of telecommunications networks, for example, a computer network (e.g., local area network (LAN) or wide area network (WAN)), the Internet, or a telephone network.

The types of the first external electronic device 902 and the second external electronic device 904 may be the same as or different from the type of the electronic device 901. According to an embodiment of the present disclosure, the server 906 may include a group of one or more servers. A portion or all of operations performed in the electronic device 901 may be performed in one or more other electronic devices (e.g., the first electronic device 902, the second external electronic device 904, or the server 906). When the electronic device 901 should perform a function or service automatically or in response to a request, the electronic device 901 may request at least a portion of the function or service from another device (e.g., the first electronic device 902, the second external electronic device 904, or the server 906) instead of or in addition to performing the function or service for itself. The other electronic device (e.g., the first electronic device 902, the second external electronic device 904, or the server 906) may perform the requested function or additional function, and may transfer a result of the performance to the electronic device 901. The electronic device 901 may use a received result as provided by the other electronic device or may perform additional processing on the received result to provide the requested function or service. To this end a cloud computing technology, a distributed computing technology, or a client-server computing technology may be used.

Figure 10:
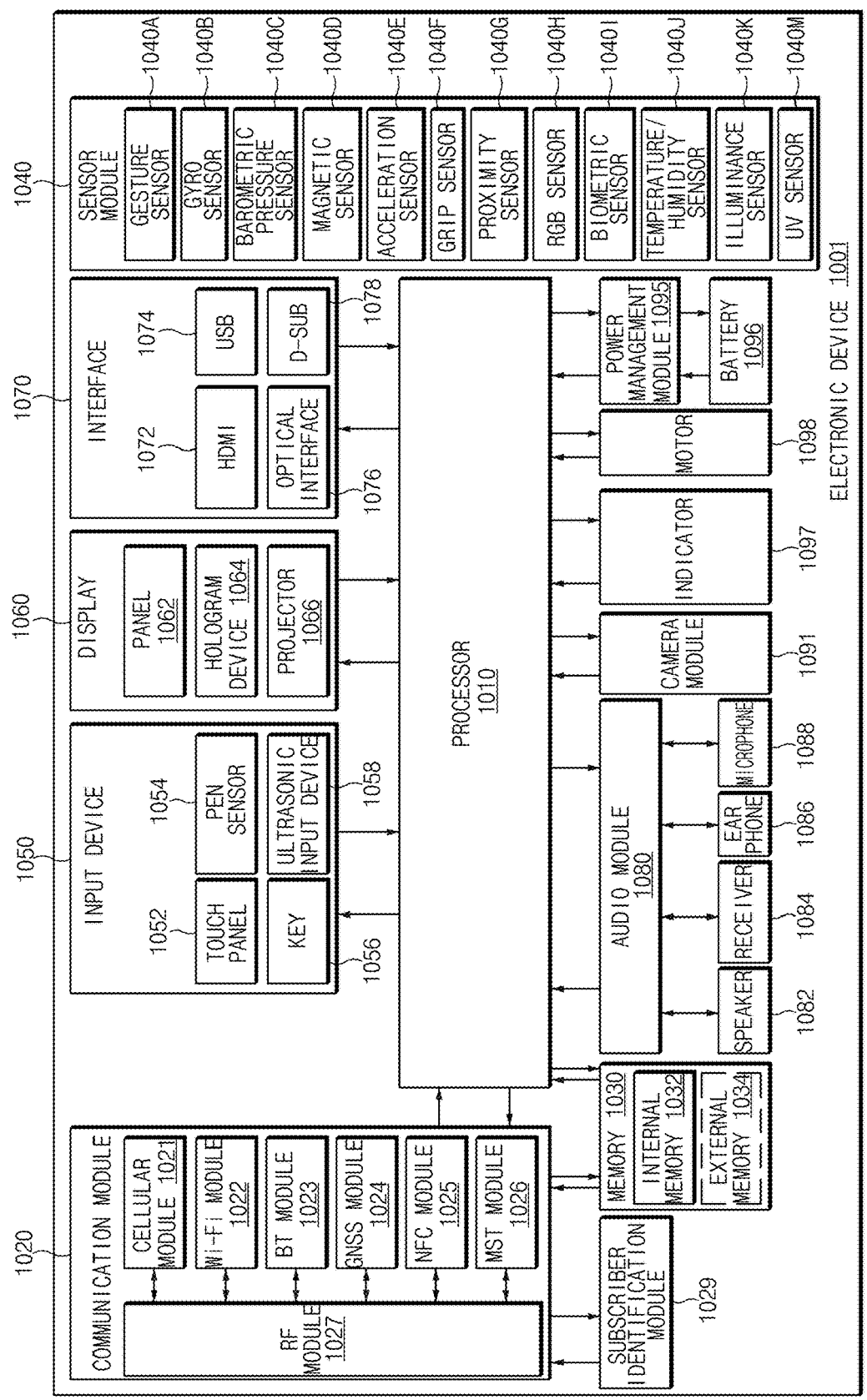
FIG. 10 is a block diagram of the electronic device according to an embodiment of the present disclosure.

FIG. 10 is a block diagram illustrating an electronic device according to an embodiment of the present disclosure.

Referring to FIG. 10, an electronic device 1001 may include a part or the entirety of the electronic device 901 illustrated in FIG. 9. The electronic device 1001 may include at least one processor (e.g., AP) 1010, a communication module 1020, a subscriber identification module (SIM) 1029, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 may run an OS or an application program to control a plurality of hardware or software elements connected to the processor 1010, and may process various data and perform operations. The processor 1010 may be implemented with a system on chip (SoC). According to an embodiment of the present disclosure, the processor 1010 may further include a graphic processing unit (GPU) and/or an image signal processor. The processor 1010 may include at least a portion (e.g., a cellular module 1021) of the elements illustrated in FIG. 10. The processor 1010 may load, on a volatile memory, an instruction or data received from at least one of other elements (e.g., a nonvolatile memory) to process the instruction or data, and may store various data in a nonvolatile memory.

The communication module 1020 may have a configuration that is the same as or similar to that of the communication interface 960 of FIG. 9. The communication module 1020 may include the cellular module 1021, a Wi-Fi module 1022, a Bluetooth (BT) module 1023, a GNSS module 1024 (e.g., a GPS module, a GLONASS module, a BeiDou module, or a Galileo module), a NFC module 1025, an MST module 1026 and a radio frequency (RF) module 1027.

The cellular module 1021 may provide a voice call service, a video call service, a text message service, or an Internet service through a communication network. The cellular module 1021 may identify and authenticate the electronic device 1001 in the communication network using the SIM 1029 (e.g., a SIM card). The cellular module 1021 may perform at least a part of the functions that may be provided by the processor 1010. The cellular module 1021 may include a CP.

Each of the Wi-Fi module 1022, the Bluetooth module 1023, the GNSS module 1024, and the NFC module 1025 may include a processor for processing data transmitted/received through the modules. According to an embodiment of the present disclosure, at least a part of the cellular module 1021, the Wi-Fi module 1022, the Bluetooth module 1023, the GNSS module 1024, and the NFC module 1025 may be included in a single IC or IC package.

The RF module 1027 may transmit/receive communication signals (e.g., RF signals). The RF module 1027 may include a transceiver, a power amp module (PAM), a frequency filter, a low noise amplifier (LNA), an antenna, or the like. According to an embodiment of the present disclosure, at least one of the cellular module 1021, the Wi-Fi module 1022, the Bluetooth module 1023, the GNSS module 1024, or the NFC module 1025 may transmit/receive RF signals through a separate RF module.

The SIM 1029 may include an embedded SIM and/or a card containing the SIM, and may include unique identification information (e.g., an integrated circuit card identifier (ICCID)) or subscriber information (e.g., international mobile subscriber identity (IMSI)).

The memory 1030 may include an internal memory 1032 or an external memory 1034. The internal memory 1032 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1034 may include a flash drive such as a compact flash (CF), a secure digital (SD), a Micro-SD, a Mini-SD, an extreme digital (xD), a multimedia card (MMC), a memory stick, or the like. The external memory 1034 may be operatively and/or physically connected to the electronic device 1001 through various interfaces.

The sensor module 1040 may measure physical quantity or detect an operation state of the electronic device 1001 to convert measured or detected information into an electrical signal. The sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, a proximity sensor 1040G, a color sensor 1040H (e.g., a red/green/blue (RGB) sensor), a biometric sensor 1040I, a temperature/humidity sensor 1040J, an illumination sensor 1040K, or an ultraviolet (UV) sensor 1040M. Additionally or alternatively, the sensor module 1040 may include an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1040 may further include a control circuit for controlling at least one sensor included therein. In an embodiment of the present disclosure, the electronic device 1001 may further include a processor configured to control the sensor module 1040 as a part of the processor 1010 or separately, such that that the sensor module 1040 is controlled while the processor 1010 is in a sleep state.

The input device 1050 may include a touch panel 1052, a (digital) pen sensor 1054, a key 1056, or an ultrasonic input device 1058. The touch panel 1052 may employ at least one of capacitive, resistive, infrared, and ultraviolet sensing methods. The touch panel 1052 may further include a control circuit. The touch panel 1052 may further include a tactile layer to provide a haptic feedback to a user.

The (digital) pen sensor 1054 may include a sheet for recognition which is a part of a touch panel or is separate. The key 1056 may include a physical button, an optical button, or a keypad. The ultrasonic input device 1058 may sense ultrasonic waves generated by an input tool through a microphone 1088 to identify data corresponding to the ultrasonic waves sensed.

The display 1060 may include a panel 1062, a hologram device 1064, or a projector 1066. The panel 1062 may have a configuration that is the same as or similar to that of the display 920 of FIG. 9. The panel 1062 may be flexible, transparent, or wearable. The panel 1062 and the touch panel 1052 may be integrated into a single module. The hologram device 1064 may display a stereoscopic image in a space using a light interference phenomenon. The projector 1066 may project light onto a screen to display an image. The screen may be disposed in the inside or the outside of the electronic device 1001. According to an embodiment of the present disclosure, the display 1060 may further include a control circuit for controlling the panel 1062, the hologram device 1064, or the projector 1066.

The interface 1070 may include an HDMI 1072, a USB 1074, an optical interface 1076, or a D-subminiature (D-sub) 1078. The interface 1070 may be included in the communication interface 960 illustrated in FIG. 9. Additionally or alternatively, the interface 1070 may include, for example, a mobile high-definition link (MHL) interface, an SD card/multi-media card (MMC) interface, or an infrared data association (IrDA) interface.

The audio module 1080 may convert a sound into an electrical signal or vice versa. At least a portion of elements of the audio module 1080 may be included in the input/output interface 950 illustrated in FIG. 9. The audio module 1080 may process sound information input or output through a speaker 1082, a receiver 1084, an earphone 1086, or the microphone 1088.

The camera module 1091 may be a device for shooting a still image or a video. According to an embodiment of the present disclosure, the camera module 1091 may include at least one image sensor (e.g., a front sensor or a rear sensor), a lens, an image signal processor (ISP), or a flash (e.g., an LED or a xenon lamp).

The power management module 1095 may manage power of the electronic device 1001. According to an embodiment of the present disclosure, the power management module 1095 may include a power management integrated circuit (PMIC), a charger IC, or a battery gauge. The PMIC may employ a wired and/or wireless charging method. The wireless charging method may include a magnetic resonance method, a magnetic induction method, an electromagnetic method, or the like. An additional circuit for wireless charging, such as a coil loop, a resonant circuit, a rectifier, or the like, may be further included. The battery gauge may measure a remaining capacity of the battery 1096 and a voltage, current or temperature thereof while the battery is charged. The battery 1096 may include a rechargeable battery and/or a solar battery.

The indicator 1097 may display a specific state of the electronic device 1001 or a part thereof (e.g., the processor 1010), such as a booting state, a message state, a charging state, or the like. The motor 1098 may convert an electrical signal into a mechanical vibration, and may generate a vibration or haptic effect. A processing device (e.g., a GPU) for supporting a mobile TV may be included in the electronic device 1001. The processing device for supporting a mobile TV may process media data according to the standards of digital multimedia broadcasting (DMB), digital video broadcasting (DVB), MediaFLO™, or the like.

According to an embodiment of the present disclosure, an electronic device includes a lens part configured to receive light from the outside, an image sensor configured to change the received light to electronic image data, and an image processing unit configured to process the image data. If a saturated pixel is included in the image data, the image processing unit measures the amount of light of the saturated pixel by using an increasing or decreasing value of brightness from a plurality of unsaturated pixels around the saturated pixel.

According to an embodiment of the present disclosure, the image processing unit measures the amount of light of the saturated pixel by using first and second adjacent pixels of a first direction with respect to the saturated pixel and third and fourth adjacent pixels of a second direction opposite to the first direction.

According to an embodiment of the present disclosure, the image processing unit measures the amount of light from the saturated pixel based on a slope value of the amount of light between the first and second adjacent pixels and a slope value of the amount of light between the third and fourth adjacent pixels.

According to an embodiment of the present disclosure, the image processing unit determines a location of a light source and the intensity of the light source by using a plurality of images having different exposure times, the plurality of images being consecutive or within a specified time interval.

According to an embodiment of the present disclosure, the image processing unit determines the location of the light source and the intensity of the light source in a first image having a first exposure time among the plurality of images and applies a light source effect to a region corresponding to the location of the light source in a second image having a second exposure time among the plurality of images.

According to various embodiments, the light source effect includes one of out-focusing, apodization, or light burst.

According to an embodiment of the disclosure, if the light source effect corresponds to alight burst, the image processing unit adjusts a size or a length of a blade of the light burst depending on a size of the light source.

According to an embodiment of the present disclosure, if the light source effect corresponds to light burst, the image processing unit measures the amount of light of the saturated pixel from an image having a reference exposure time among the plurality of images.

According to an embodiment of the present disclosure, if the light source effect corresponds to out-focusing or apodization, the image processing unit changes a shape of the light source effect depending on a location of the image sensor, at which the light source is imaged.

According to an embodiment of the present disclosure, if determining the intensity of the light source by using the plurality of images, the image processing unit measures the amount of light of each of red (R), green (G), and blue (B) of the saturated pixel from an image of a specified exposure time or shorter among the plurality of images.

According to an embodiment of the present disclosure, if the light source effect corresponds to the out-focusing, the image processing unit determines a shape of the light source effect as one circle on a center of the image sensor, and if an image-formation region is changed in a direction radially away from the center of the image sensor, the image processing unit allows the light source effect to have a shape of a common region of a plurality of circles, centers of which do not coincide with each other.

According to an embodiment of the present disclosure, if the light source effect corresponds to the apodization, the image processing unit differently sets transparencies of a central portion and a peripheral portion of the shape of the light source effect.

According to an embodiment of the present disclosure, the image processing unit applies the light source effect with reference to a lookup table associated with a shape to apply the light source effect.

According to an embodiment of the present disclosure, the image processing unit determines the location of the light source and an intensity of the light source by using an image of a specified exposure time or shorter among the plurality of images.

Each of the elements described herein may be configured with one or more components, and the names of the elements may be changed according to the type of an electronic device. In an embodiment of the present disclosure, an electronic device may include at least one of the elements described herein, and some elements may be omitted or other additional elements may be added. Furthermore, some of the elements of the electronic device may be combined with each other to form one entity such that that the functions of the elements may be performed in the same manner as before the combination.

The term "module" used herein may represent a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor, the processor may perform functions corresponding to the instructions. The computer-readable storage medium may be, for example, the memory 930.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language code generated by compilers and high-level language code that can be executed by computers using interpreters. The above-mentioned hardware device may be configured to be operated as one or more software modules for performing operations of an embodiment of the present disclosure and vice versa.

A module or a program module according to an embodiment of the present disclosure may include at least one of the above-mentioned elements, or some elements may be omitted or other additional elements may be added. Operations performed by the module, the program module or other elements may be performed in a sequential, parallel, iterative, or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a lens part configured to receive light from the outside;
   an image sensor configured to change the received light to electronic image data; and
   an image processing unit configured to process the image data,
   wherein if a saturated pixel is included in the image data, the image processing unit measures the amount of light of the saturated pixel by using an increasing or decreasing value of brightness of a plurality of unsaturated pixels around the saturated pixel.

2. The electronic device of claim 1, wherein the image processing unit measures the amount of light of the saturated pixel by using first and second adjacent pixels from a first direction with respect to the saturated pixel, and third and fourth adjacent pixels from a second direction opposite to the first direction.

3. The electronic device of claim 2, wherein the image processing unit measures the amount of light of the saturated pixel based on a slope value of the amount of light between the first and second adjacent pixels, and a slope value of the amount of light between the third and fourth adjacent pixels.

4. The electronic device of claim 1, wherein the image processing unit determines a location of a light source and the intensity of the light source by using a plurality of images having different exposure times, the plurality of images being captured within one of a consecutive time interval, and a specified time interval.

5. The electronic device of claim 4, wherein the image processing unit determines the location of the light source and the intensity of the light source in the first image having a first exposure time among the plurality of images, and applies a light source effect to a region corresponding to the location of the light source in the second image having a second exposure time among the plurality of images.

6. The electronic device of claim 5, wherein the light source effect includes one of out-focusing, apodization, and light burst.

7. The electronic device of claim 5, wherein if the light source effect corresponds to a light burst, the image processing unit adjusts one of a size and a length of a blade of the light burst depending on a size of the light source.

8. The electronic device of claim 5, wherein if the light source effect corresponds to a light burst, the image processing unit measures the amount of light of the saturated pixel from an image having a reference exposure time among the plurality of images.

9. The electronic device of claim 5, wherein if the light source effect corresponds to one of out-focusing and apodization, the image processing unit changes a shape of the light source effect depending on a location of the image sensor.

10. The electronic device of claim 9, wherein if determining the intensity of the light source by using the plurality of images, the image processing unit measures the amount of light of each of red (R), green (G), and blue (B) of the saturated pixel from an image of one of a specified exposure time and a shorter exposure time among the plurality of images.

11. The electronic device of claim 9, wherein if the light source effect corresponds to out-focusing, the image processing unit determines a shape of the light source effect as one circle on a center of the image sensor, and
   wherein if an image-formation region is changed in a direction radially away from the center of the image sensor, the image processing unit allows the light source effect to have a shape of a common region of a plurality of circles, the centers of which do not coincide with each other.

12. The electronic device of claim 9, wherein if the light source effect corresponds to apodization, the image processing unit sets transparencies of a central portion and a peripheral portion of the shape of the light source effect.

13. The electronic device of claim 5, wherein the image processing unit applies the light source effect with reference to a lookup table associated with a shape to apply the light source effect.

14. The electronic device of claim 4, wherein the image processing unit determines the location of the light source and an intensity of the light source by using one of an image of a specified exposure time and a shorter exposure time among the plurality of images.

15. An image processing method performed in an electronic device, the method comprising:
   changing light received from the outside to electronic image data through an image sensor;
   collecting image data of a first image having a first exposure time;
   if a saturated pixel is included in the image data, verifying an increasing or decreasing value of brightness of a plurality of unsaturated pixels around the saturated pixel; and
   measuring the amount of light of the saturated pixel based on the increasing or decreasing value.

16. The method of claim 15, wherein verifying the increasing or decreasing value includes:
   verifying the amounts of light of first and second adjacent pixels from a first direction with respect to the saturated pixel; and
   verifying the amount of light of the saturated pixel by using third and fourth adjacent pixels from a second direction opposite to the first direction.

17. The method of claim 16, wherein verifying the increasing or decreasing value includes:
   comparing a slope value of the amount of light between the first and second adjacent pixels and a slope value of the amount of light between the third and fourth adjacent pixels.

18. The method of claim 15, wherein collecting the image data includes:
   collecting image data of a second image having a second exposure time longer than the first exposure time.

19. The method of claim 18, further comprising:
applying a light source effect to a region corresponding to a saturated pixel of the second image.

20. The method of claim 19, wherein applying the light source effect includes:
applying one of out-focusing, apodization, and light burst as the light source effect.

\* \* \* \* \*